Patented Mar. 27, 1934

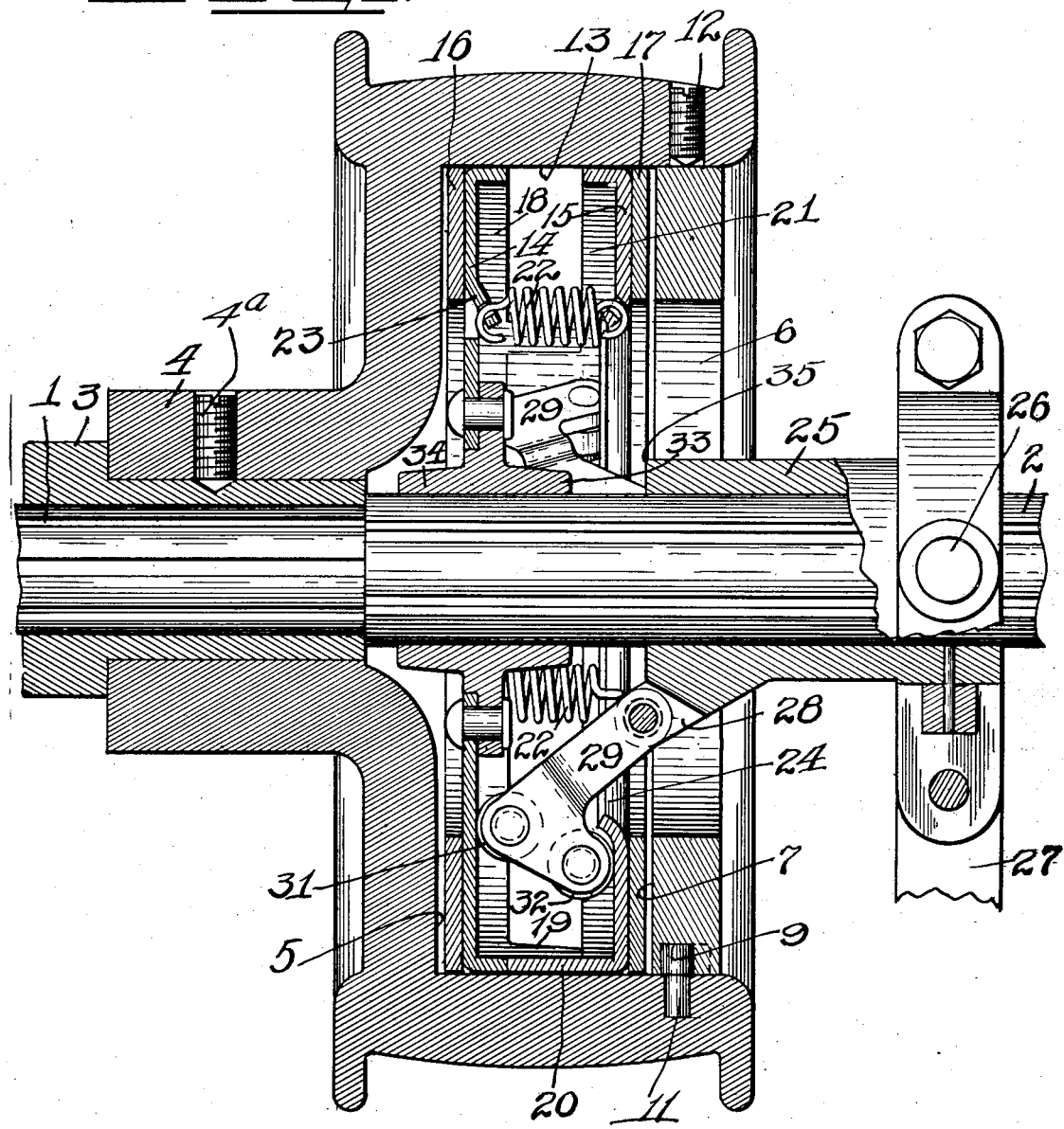

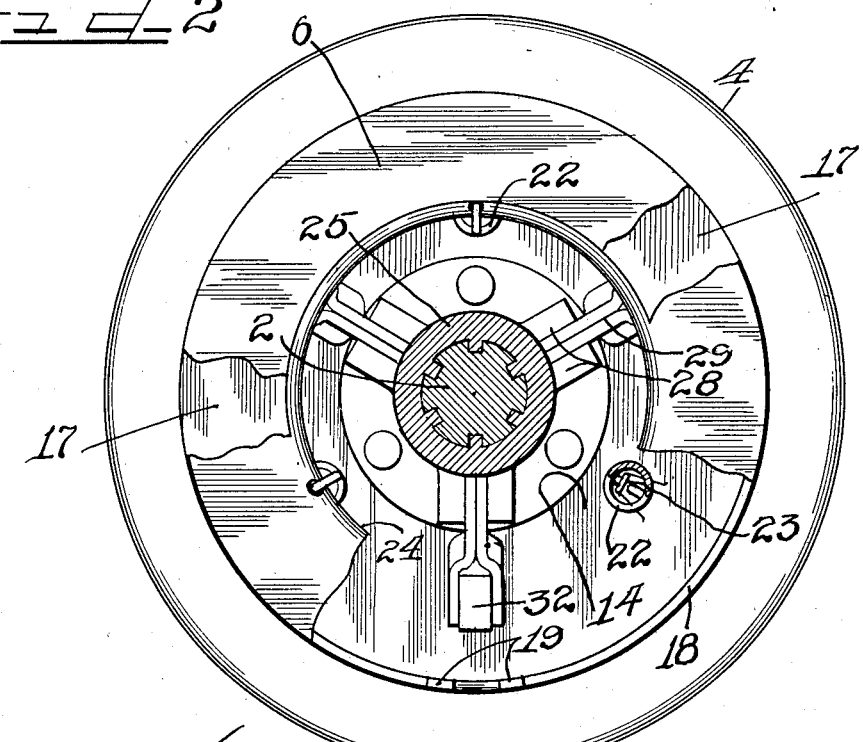
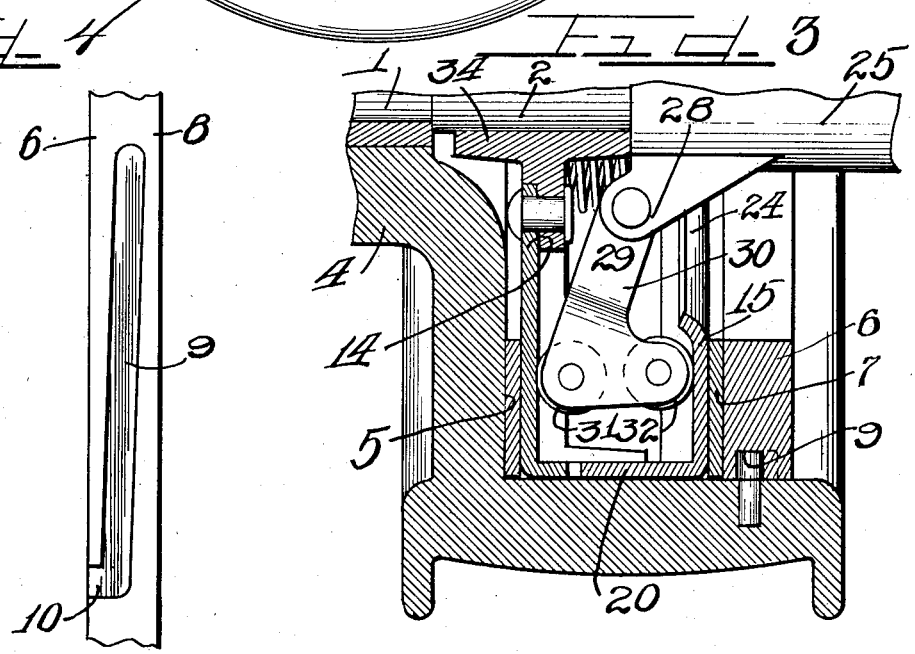

1,952,462

UNITED STATES PATENT OFFICE 1,952,462

CLUTCH

Carl A. Ruesenberg, Rockford, Ill., assignor to Rockford Drilling Machine Company, Rockford, Ill., a corporation of Illinois Application February 6, 1931, Serial No. 513,905

10 Claims. (Cl. 192—70)

This invention has to do with clutches, more particularly of the friction type employed in machine shops, on tractors, steam shovels, road building machines, and in fact for any industrial purpose.

One of the most common faults of clutches resides in the failure to provide adequate instrumentalities for adjustment to compensate for wear in the clutch parts. The adjusting means heretofore known have been rather complicated, or have been disposed in highly inaccessible places or were for one reason or another undependable. Accordingly, one of the principal objects of the present invention is to provide, in a clutch construction, adjusting means, which is extremely simple, not only in construction but also in operation, and which is easily accessible.

Another drawback of clutches of this character heretofore in vogue resides in the fact that the parts were so located as to be adversely affected by centrifugal force. It is one of the objects of the present invention to provide a clutch construction which operates in a manner entirely independent of centrifugal force.

Another object of the invention resides in the provision of a clutch construction employing a plurality of clutch elements urged into collapsed condition by spring means, and toggle mechanism for maintaining the clutch elements apart for engagement with a driving member.

It is a further object of the invention to provide a clutch construction requiring few parts, involving a minimum of machining, constructed largely of stamped metal parts, and wherein substantially all of the operating instrumentalities are practically enclosed so that entry of foreign matter is in a large measure inhibited.

In carrying out the invention into practice, I provide on a drive shaft a pulley hollowed out to provide a clutch surface and to house my improved clutch construction and operating instrumentalities therefor. The gripping device per se comprises discs having clutch pads, one of which is engageable with the clutch surface, and one of the discs being mounted on a hub splined on a driven shaft. The discs are interlocked in such a manner as to prevent their relative movement both rotatably and radially, yet so that they are capable of relative axial movement. Springs constantly urge the discs toward each other into collapsed condition. A member providing a surface for engagement with the pad on the other disc is located within the pulley adjacent the outer end thereof and is adjustable toward and away from the pulley by means of a pin and helical slot connection with the pulley. A set screw accessible from the exterior of the pulley impinges on the adjustable member and maintains the member fixedly in position.

A sleeve splined on the driven shaft carries toggle members interposed between the discs to spread the latter into clutching engagement with the clutch surfaces, the latter discs being held thus by abutting engagement of the sleeve and the hub. The springs yieldably hold the clutch engaged or disengaged, as the case may be.

The discs and toggle links may be manufactured cheaply by reason of their being made of sheet metal, and the device is very compact. By merely backing off the set screw, the adjusting member may be readily turned to the desired degree of adjustment, whereupon the screw is tightened. This is a matter of but a few moments.

Further objects and advantages will appear as the description proceeds.

On the drawings:

Figure 1 represents a fragmentary central sectional view showing the present invention in detail, the clutch being shown disengaged.

Figure 2 is an end view looking toward the left in Figure 1, certain parts being broken away to afford a better view of the clutch operating means.

Figure 3 is a fragmentary sectional view showing the lower portion of the structure appearing in Figure 1, but with the clutch engaged.

Figure 4 is a fragmentary development of the outer periphery of the wear compensating adjustment device carried by the driving member.

Referring now more particularly to the drawings, wherein the same part is indicated in each case by the same reference character, a driving shaft 1 is disclosed in alignment with a driven shaft 2, the latter having an end portion bearing in the corresponding end of the driving shaft 1. A sleeve 3 is splined on the shaft 1, and a member 4, which, for the purpose of the present illustration, is shown as a pulley is keyed to the sleeve 3 by means of the screw 4ª, so that the members 1, 3, and 4 rotate as a unit. It is to be understood, of course, that the members 1, 3, and 4 may be connected in any desirable manner, so long as they rotate together. The pulley 4 is provided with a clutch engaging surface 5, and an annulus 6, adjustable relative to the pulley 4, and providing a corresponding clutch surface 7, is removably secured within the pulley 4 and in spaced relation to the surface 5.

The annulus 6 is provided in its outer periphery 8 with a bayonet slot 9, the major portion of which is helical. The offset portion 10 of the slot is provided merely for quick assembly and disassembly. A pin 11, embedded in the interior of the pulley 4, projects into the slot 9 and provides for adjustment of the annulus 6 upon rotary movement of the latter. A set screw 12 is carried by and projects from the pulley 4 and is adapted to impinge upon the outer periphery 8 of the annulus 6 at a point diametrically opposite the pin 11, to thereby rigidly hold the annulus 6 against accidental movement. In order to positively insure against any accidental movement of the annulus 6, the latter is made to fit snugly in the interior cylindrical surface 13 of the pulley 4 and, if desired, one or more additional slots 9 and pins 11 may be provided for this purpose.

The clutch unit constructed in accordance with the present invention comprises a pair of discs 14 and 15, provided with clutch pads or facings 16 and 17 capable of clutching engagement respectively with the surfaces 5 and 7. Each disc is substantially cup-shaped, and the flange 18 of the disc 14 is provided with three equally spaced slotted extensions 19 in which the tongues 20, constituting extensions of the flange 21 of the disc 15, fit. Of course, it is to be understood that the number of extensions on the discs may be varied, three being disclosed herein for the purpose of illustration only. However, it is in any event desirable that these extensions be so arranged that they serve not only to guide the discs 14 and 15 in their relative axial movement, but serve also to prevent relative radial movement of the discs. The length of the extensions 19 is such (and this is also true of extensions 20) that when they are in abutting engagement with the flange of the opposite disc, and thereby prevent further relative movement of the discs toward each other, the clutch pads 16 and 17 are slightly spaced from the surfaces 5 and 7, so that the clutch is disengaged. The discs 14 and 15 are thus in collapsed condition.

The discs are yieldably maintained collapsed by means of contractive springs 22, three or more in number, preferably, one end of each spring being hooked about a perforated struck-up portion 23 in the disc 14 and the other end being hooked about a portion of the inner peripheral flange 24 of the disc 15. It is to be understood that in this connection any other suitable connecting means for the ends of the spring may be provided, and that the springs may be of any other suitable construction.

The clutch disc operating instrumentalities forming a part of the present invention include a sleeve 25 having the usual trunnions 26 adapted to be received in a shifter lever 27, as is well known. The end 35 of the sleeve 25 adjacent the clutch parts above set forth is provided with a plurality of bifurcated extensions 28, three being disclosed herein for the purpose of illustration only, in which the angular toggle links 29 are pivotally received. Each link 29 consists of a pair of parts 30 and is bifurcated to receive the rollers 31 and 32, the latter being in engagement with the discs 14 and 15, respectively. When the discs 14 and 15 are in collapsed condition as shown in Figure 1, the roller 31 is less distant from the axis of the shafts than is the roller 32, and so long as no force is exerted on the sleeve 25 to move the same in the direction of the pulley 4, the springs 22 serve to prevent radial outward movement of the roller 31, the spring pressure being exerted upon the rollers through the medium of the discs 14 and 15, respectively.

With the parts as arranged in Figure 1, it will be appreciated that there is no driving connection between the shafts 1 and 2. In order to set up this driving relation, the shifter lever 27 is actuated to move the sleeve 25 to the left, as viewed in Figure 1, against the action of the springs 22. As the sleeve 25 moves, the links 29 are caused to pivot about the extensions 28, thus forcing the rollers 31 and 32 radially outward, the roller 31 moving to a greater extent than the roller 32. The distance between the disc contacting portions of the rollers is such that when their line of centers is normal to the disc surfaces engaged by the rollers, the clutch pads or facings 16 and 17 are in tight engagement with the surfaces 5 and 7. The end 33 of the hub 34, which hub is splined on the driven shaft 2, and is riveted or otherwise fastened to the disc 14, is so arranged with respect to the end 35 of the sleeve 25, that when such ends are in abutment, in consequence of continued movement of the sleeve 25 to the left as viewed in Figure 1, the roller 31 is located radially slightly outward beyond the roller 32, the distance being sufficient to render the springs 22 effective as part of the toggle mechanism to yieldably maintain the rollers 31 and 32 in this relation, yet so slight as to maintain the clutch pads or facings 16 and 17 in proper clutching engagement with the surfaces 5 and 7, respectively.

Thus it will be seen that although the springs 22 constantly exert a force tending to collapse the clutch instrumentalities, they serve also to maintain the ends 33 and 35 in abutment to thereby prevent such collapse, when the rollers are positioned in the relation just mentioned. This will become particularly clear when it is realized that, as long as the line of centers of the rollers 31 and 32 is non-parallel to the axis of the shaft 2, that is, when the rollers are beyond dead center one way or the other, the springs 22, through the medium of the links 29, urge said sleeve away from or toward the hub 34, depending upon whether the roller 31 is above or below dead center as viewed in Figure 1. It will accordingly be appreciated that, whether the clutch instrumentalities be collapsed or extended, the springs 22 serve to yieldably maintain the same thus.

The hub 34 being disposed centrally of the disc 14, it will be appreciated that the discs 14 and 15 will both be properly centered on the driven shaft 2. The discs 14 and 15 are preferably stamped out of sheet metal, so that their cost of manufacture is exeremely low. The parts 30 of each link 29 are likewise preferably made of sheet metal to reduce the cost of manufacture, although the links may, if desired, be made of single parts. On the whole, it will be seen that the complete clutch construction involves a remarkably small number of parts, and the discs 14 and 15 and associated toggle mechanism are practically entirely enclosed in the pulley 4 to inhibit to a substantial extent the entry of foreign matter between the clutch pads 16 and 17 and the respective surfaces 5 and 7.

The annulus 6 may be gripped at its inner periphery and rotated for purposes of adjustment or otherwise and, if desired, suitable wrench engaging means may be incorporated in the annulus 6 to facilitate such adjustment or removal.

The flange 24 on the disc 15 serves as an abutment against which the roller 32 may engage to prevent removal of the links 29 and associated rollers. Thus, while the links 29 and rollers are in no way fastened or connected to the individual discs 14 and 15, yet, by reason of the particular construction of the discs, it is impossible to remove the links 29 without first removing the annulus 6 and the disc 15.

While I have illustrated the clutch engaging member as being a pulley, it will be appreciated that the invention is equally susceptible of use in connection with a flywheel or the like. Moreover, the rollers 31 and 32 could be obviated and the bifurcated portions of the links 29 properly dimensioned to operate as intended. In addition, the helical slot and pin construction could be reversed, if desired.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. A clutch comprising clutch elements, contractive springs connecting said elements, said elements having interlocked tongues and grooves for simultaneous rotation and for guiding said elements in relative axial movement and limiting collapsive movement of the same, certain of said grooves being non-diametrally related to center said elements, a hub connected to one of said elements, and means for spreading said elements, said means comprising links coacting with said springs to form a toggle mechanism, said links having rollers engaging the interior faces of said elements, a sleeve coaxial with said hub and pivotally connected to said links, said sleeve being shiftable axially to cause the rollers to spread said elements against the action of said springs and to be disposed slightly on the opposite side of the dead center, said hub and sleeve abutting each other when the rollers are thus disposed to thereby maintain the elements in extended condition, said springs, links and abutting portions of the hub and sleeve being disposed between said elements.

2. A clutch comprising clutch elements, contractive springs connecting said elements, said elements having interlocked tongues and grooves for simultaneous rotation and for guiding said elements in relative axial movement and limiting collapsive movement of the same, certain of said grooves being non-diametrally related to center said elements, a hub connected to one of said elements, and means for spreading said elements, said means comprising links coacting with said springs to form a toggle mechanism, said links having rollers engaging the interior faces of said elements, a sleeve coaxial with said hub and pivotally connected to said links, said sleeve being shiftable axially to cause the rollers to spread said elements against the action of said springs and to be disposed slightly on the opposite side of the dead center, said hub and sleeve abutting each other when the rollers are thus disposed to thereby maintain the elements in extended condition.

3. A clutch comprising gripping elements, contractive springs connecting said elements, instrumentalities for maintaining said elements axially alined and to guide said elements in relative axial movement, a hub connected to one of said elements, and means for spreading said elements, said means comprising links coacting with said springs to form a toggle mechanism, said links having rollers engaging the interior faces of said elements, a sleeve coaxial with said hub and pivotally connected to said links, said sleeve being shiftable axially to cause the rollers to spread said elements against the action of said springs and to be disposed slightly on the opposite side of the dead center, said hub and sleeve abutting each other when the rollers are thus disposed to thereby maintain the elements in extended condition.

4. A clutch comprising clutch elements, contractive springs connecting said elements, said elements having interlocked tongues and grooves for simultaneous rotation and for guiding said elements in relative axial movement and limiting collapsive movement of the same, certain of said grooves being non-diametrally related to center said elements, a hub connected to one of said elements, and means for spreading said elements, said means comprising links coacting with said springs to form a toggle mechanism, said links having rollers engaging the interior faces of said elements, a sleeve coaxial with said hub and pivotally connected to said links, said sleeve being shiftable axially to cause the rollers to spread said elements against the action of said springs and to be disposed slightly on the opposite side of the dead center, said hub and sleeve abutting each other when the rollers are thus disposed to thereby maintain the elements in extended condition, and means for constraining the hub and the sleeve for coaxial movement.

5. A clutch comprising clutch elements, contractive springs connecting said elements, said elements having interlocked tongues and grooves for simultaneous rotation and for guiding said elements in relative axial movement and limiting collapsive movement of the same, certain of said grooves being non-diametrally related to center said elements, a hub connected to one of said elements, and means for spreading said elements, said means comprising links coacting with said springs to form a toggle mechanism, said links having rollers engaging the interior faces of said elements, a sleeve coaxial with said hub and pivotally connected to said links, said sleeve being shiftable axially to cause the rollers to spread said elements against the action of said springs and to be disposed slightly on the opposite side of the dead center, said hub and sleeve abutting each other when the rollers are thus disposed to thereby maintain the elements in extended condition, and a device for adjusting for wear of said elements.

6. A clutch comprising relatively movable clutch elements, springs urging said elements toward each other into collapsed condition, means for spreading said elements, a member for rotating with and constituting a housing for said elements, a readily attachable and removable annulus fitting snugly into said housing and having a surface engageable with the surface of the adjacent element, said annulus having a bayonet slot including a helical portion in its outer periphery, a pin in said housing and engageable in said slot, whereby said annulus is readily adjustable axially relative to said elements, and means for securing said annulus in any position of adjustment.

7. A clutch comprising relatively movable gripping elements, a member for rotating with and constituting a housing for said elements and having a surface to be gripped by one of said elements, a readily attachable and removable annulus fitting snugly into said housing and having a surface for gripping engagement with the other of said elements, means for moving said elements into gripping engagement with the surfaces of said housing and annulus, respectively, said annulus and housing being provided with a cooperating bayonet slot and pin means engageable in said slot, whereby said annulus is readily adjustable axially of said elements, and means for securing said annulus in any position of adjustment.

8. A clutch comprising relatively movable gripping elements, a member for rotating with and constituting a housing for said elements and having a surface to be gripped by one of said elements, a readily attachable and removable annulus fitting snugly into said housing and having a surface for gripping engagement with the other of said elements, means for moving said elements into gripping engagement with the surfaces of said housing and annulus, respectively, said annulus and housing being provided with a cooperating bayonet slot and pin means engageable in said slot, whereby said annulus is readily adjustable axially of said elements, means for securing said annulus in any position of adjustment, and yieldable means urging said elements toward each other.

9. A clutch comprising relatively movable clutch elements, means for spreading said elements, a member for rotating with and constituting a housing for said elements, a readily attachable and removable annulus fitting snugly into said housing and having a surface engageable with the surface of the adjacent element, said annulus having a bayonet slot including a helical portion in its outer periphery, a pin in said housing and engageable in said slot, whereby said annulus is readily adjustable axially relative to said elements, and means for securing said annulus in any position of adjustment.

10. A clutch housing including a cup-shaped member and a removable retainer for the open end thereof, said member and retainer having facing, spaced clutch surfaces, and a gripping device capable of assembly and disassembly as a unit with respect to said housing, said device comprising gripping elements disposed between and engageable with the respective faces of said housing, resilient means associated with said elements and urging them toward each other, over-center means movably connected to said elements and including parts disposed between said elements for moving said elements away from each other and into engagement with the respective faces of said housing against the action of said resilient means until said parts are arranged slightly on the opposite side of dead center, one of said elements and said means abutting each other when the parts are thus arranged to thereby maintain the elements in engagement with the respective faces.

CARL A. RUESENBERG.